United States Patent
Loose

(10) Patent No.: US 7,417,675 B2
(45) Date of Patent: Aug. 26, 2008

(54) ON-CHIP BLACK CLAMP SYSTEM AND METHOD

(75) Inventor: Markus Loose, Thousand Oaks, CA (US)

(73) Assignee: Altasens, Inc., Westlake Village, CA (US)

( * ) Notice: Subject to any disclaimer, the term of this patent is extended or adjusted under 35 U.S.C. 154(b) by 1025 days.

(21) Appl. No.: 10/436,945

(22) Filed: May 12, 2003

(65) Prior Publication Data

US 2004/0227827 A1 Nov. 18, 2004

(51) Int. Cl.
*H04N 9/64* (2006.01)
(52) U.S. Cl. .................... 348/243; 348/308; 348/374
(58) Field of Classification Search ......... 348/243–251, 348/308, 222.1, 306, 374
See application file for complete search history.

(56) References Cited

U.S. PATENT DOCUMENTS

| | | |
|---|---|---|
| 6,507,365 B1 | 1/2003 | Nakmura et al. |
| 6,774,942 B1 * | 8/2004 | Salcedo et al. ............... 348/243 |
| 6,788,340 B1 * | 9/2004 | Chen et al. ............... 348/229.1 |
| 6,903,768 B1 | 6/2005 | Ohsawa et al. |
| 6,940,548 B2 * | 9/2005 | Ying et al. .................. 348/241 |
| 2001/0005226 A1 * | 6/2001 | Muramatsu et al. ......... 348/304 |
| 2003/0117676 A1 | 6/2003 | Nakamura et al. |

FOREIGN PATENT DOCUMENTS

JP 2000 031450 A 1/2000

OTHER PUBLICATIONS

M. Loose et al., "2/3-Inch CMOS Imaging Sensor for High Definition Television", 2001 IEEE Workshop on CMOS and CCD Imaging Sensors, (Jun. 2001) pp. 1-4.
Lester J. Kozlowski et al., "Theoretical Basis and Experimental Confirmation: Why a CMOS Imager is Superior to a CCD", PROC. SPIE vol. 3698, *Infared Technology and Applications XXV*; Bjorn F. Andreasen Marija Strojinik; EDS., (Jul. 1999) p. 388-396.
L. J. Kozlowski et al., "Performance Limits in Visible and Infrared Imager Sensors", Electron Devices Meeting, 1999. *IDEM Technical Digest International*, 5-8 (Dec. 1999) pp. 867-870.
International Search Report and Written Opinion, PCT/US2004/036508 issued Jan. 07, 2005.

* cited by examiner

*Primary Examiner*—Lin Ye
*Assistant Examiner*—Gevell Selby
(74) *Attorney, Agent, or Firm*—Venable LLP; Stefan J. Kirchanski; Matthew J. Spark

(57) ABSTRACT

An image sensing system includes an image sensor and a black clamping circuit which reside on the same substrate. Particular embodiments use common components for both imaging and black clamping, and digital control of an analog black clamp function.

7 Claims, 3 Drawing Sheets

ON-CHIP BLACK CLAMP SYSTEM AND METHOD

BACKGROUND OF THE INVENTION

1. Field of the Invention

This invention relates to digital imaging devices, and particularly to on-chip black normalization for digital imaging devices.

2. Description of the Related Art

Digital imaging has become popular in recent years, including digital cameras, digital camcorders and high definition televisions (HDTVs). Most digital imaging systems use an image sensor that converts visible light into an analog or digital signal. Many image sensor applications, especially video applications, require a signal level to represent the absence of visible light (the color black). The signal level that corresponds to black needs to be stable over varying temperatures and illumination conditions so that the image sensor delivers consistent color quality.

Black normalization, or black clamping, is a process used by imaging systems to maintain an accurate black reference over time. Some of the sensor's pixels are masked to generate a signal that corresponds to black. This signal is used to update and maintain a black reference for the overall sensor.

Black normalization is more important for video or HDTV applications because it has to be performed almost instantaneously and continuously. It is less critical for still photography applications because normalization of all colors can be accomplished at some time after the image has been captured.

An image sensor currently used by many imaging systems is a charge-coupled device (CCD). Black clamping in CCD imaging systems has been accomplished separate from the image sensing chip, as shown in STMicroelectronics' data sheet STV0502. Therefore, CCD imaging systems occupy a relatively large amount of space on a circuit board and are expensive to manufacture. As shown in the same data sheet, black clamping is done with analog components, which are difficult to control and are limited in the calculations that can be performed during the normalization process.

Another type of image sensor employs CMOS sensing elements. CMOS sensors use a fixed black reference or are used in applications that do not need a continuously updated, accurate black reference.

SUMMARY OF THE INVENTION

The present invention provides for an image sensing system and method with an image sensor and a black clamping circuit on a common substrate. Other aspects of the invention include utilizing common components for both the imaging system and the black clamping function, and digitally controlling an analog black clamping function. Reductions are achieved in circuit board space, manufacturing time and cost.

One embodiment includes an electromagnetic radiation detector configured to produce an analog image signal, a differential amplifier (diff. amp.) connected to subtract a reference from the image signal to produce a normalized signal, and to drive an analog-to-digital converter (ADC) that converts the normalized signal to a digital format, a controller connected to control the timing and operation of the imaging system, and a black clamp circuit which also shares the diff. amp. and ADC with the rest of the imaging system to maintain a black reference. The diff. amp and ADC are used in both the imaging system and the black clamping circuit, reducing the amount of space needed for the overall system and its manufacturing costs.

Another feature is analog correction of the black reference signal with a digital control. This mixed signal approach allows for very accurate control of the black clamping function. Additional functions, such as averaging a group of error signals, can also be performed digitally to increase the precision of the black clamp control. When compared with conventional imaging systems, this embodiment provides better control of, and allows for easier calculations to be performed with, the black reference signal.

Further features and advantages of the invention will be apparent to those skilled in the art from the following detailed description, taken together with the accompanying drawings.

DETAILED DESCRIPTION OF THE INVENTION

Figure 1:
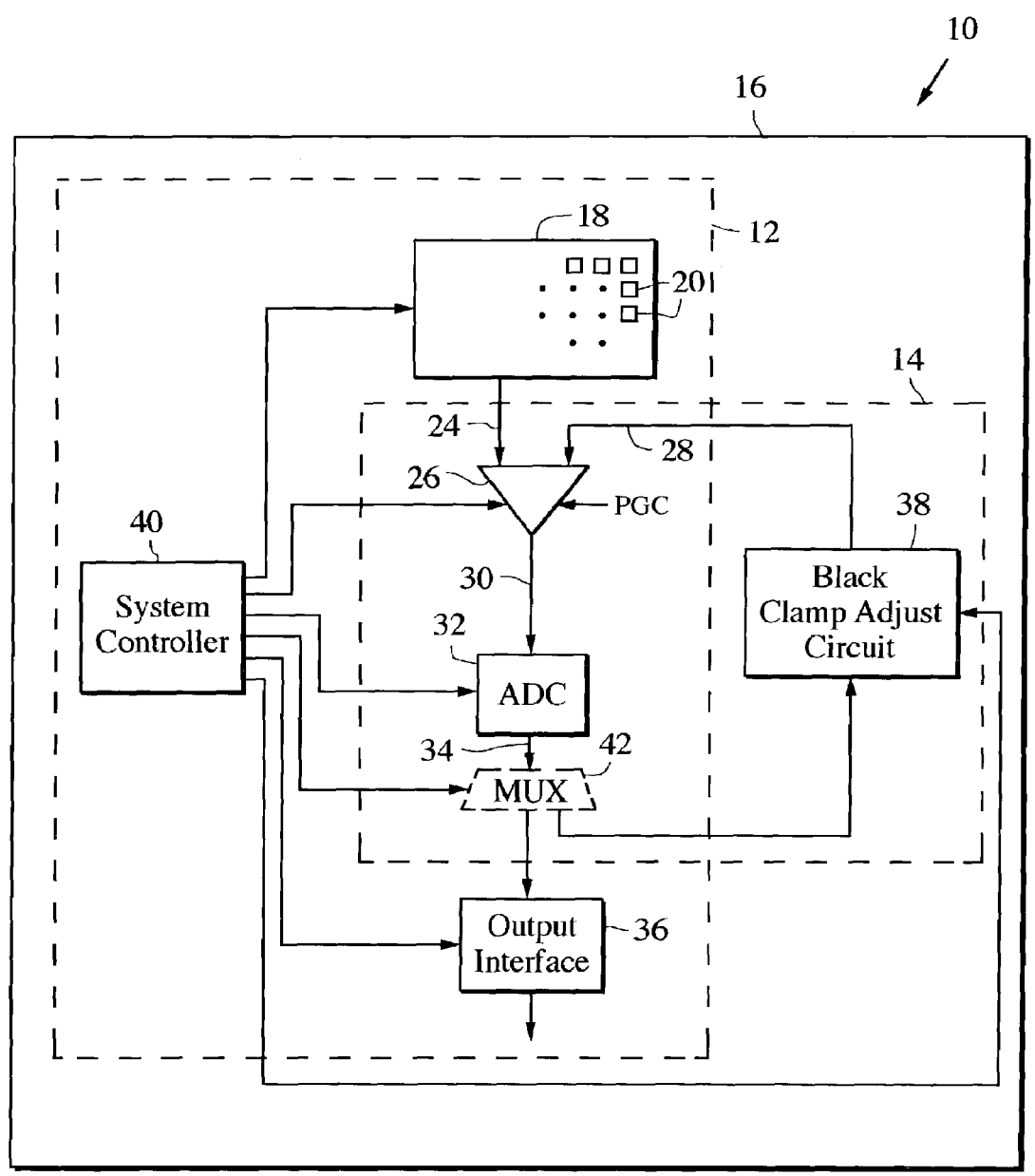
FIG. 1 is a block diagram of an imaging system with a black clamping circuit on a common substrate according to one embodiment of the invention.

An image sensing system 10 with black clamping according to one embodiment of the invention is illustrated in FIG. 1. The system includes an image sensor 12 and a black clamp circuit 14 on a common substrate 16, typically an integrated circuit chip. Black clamp circuit 14 maintains an accurate black reference for image sensor 12. The sensors and circuitry may be all CMOS or bipolar, thus simplifying the fabrication process. Forming all active elements on a common substrate reduces the space and complexity of the overall system.

The image sensor 12 includes an array 18 of electromagnetic radiation detector pixels 20, with an image signal output on line 24 to a diff. amp. 26. A diff. amp. for purposes of this application is defined as an amplifier whose output varies with the difference between its inputs. The variation can be either linear or non-linear. It can be provided with a programmable gain control (PGC) if desired, and may have a unity gain setting. The diff. amp. also receives a black reference signal on line 28, and outputs a normalized image signal on comparator output line 30. An analog-to-digital converter (ADC) 32 converts the normalized image signal from analog to a digital signal on ADC output line 34. The gain of diff. amp. 26 is normally selected to match the ADC input range. An output interface 36 conditions the digital normalized image signal for transmission to a display device, such as a HDTV.

The digital normalized image signal on ADC output line 34 is also used by black clamp circuit 14, which maintains a black reference signal on line 28 for imaging system 10. Black clamp circuit 14 includes a black clamp adjust circuit 38, diff. amp. 26 and ADC 32. Since some components of image sensor 12 are also used for black clamping, the size and complexity of the overall system is reduced.

A system controller 40 controls the activation state of black clamp adjust circuit 38. Some pixels in array 18 are shielded from incident radiation (masked). When signals from masked pixels are transmitted from array 18, black clamp adjust circuit 38 is activated by controller 40 and maintains the black reference signal. Black clamp adjust circuit 38 is deactivated, or alternatively disconnected from the ADC output, when signals from unmasked pixels are transmitted, and maintains a constant black reference signal during this time.

Because only a relatively small number of rows of pixels are masked (typically 1-10 out of 1000+rows), all of the pixel signals may be sent to output interface 36 to be displayed by a display device. The masked pixels may appear on the display device as a very narrow black line at an edge of the displayed image. Normally, however, they are within a blanking interval that is outside the visible image frame.

Instead of activating and deactivating black clamp adjust circuit 38, the controller 40 can be programmed to route the digital normalized image signal on ADC output line 34 to either black clamp adjust circuit 38 or to output interface 36 by controlling a multiplexer 42, shown in dashed lines. In this manner, the black clamp adjust circuit 38 will only receive masked pixel signals, and output interface 36 will only receive unmasked pixel signals. With either approach, diff. amp. 26 and ADC 32 are used for both outputting image signals and for black clamping. Controller 40 synchronizes the multiplexer with the masked and unmasked pixel signals, and also controls the timing and operation of the overall system.

Array 18 is typically a two-dimensional row-column array of pixels 20, but other configurations such as a three-dimensional or circular array may be used. Each pixel 20 includes an electromagnetic radiation sensitive device such as a photodiode or phototransistor, and a read-out amplifier. The invention is most commonly applicable to photosensitive detectors which are sensitive to visible light, infrared and/or ultraviolet, but it is also applicable to other regions of the electromagnetic spectrum. Different arrays can be designed to sense different portions of the electromagnetic spectrum, visible and/or non-visible, by conventional mechanisms such as the choice of materials and structure. The output analog voltage from the array varies with the level of incident radiation.

Output interface 36 is conventional in conditioning the digital signal received from ADC 32 for further transmission. It typically includes data compression and digital filters.

Figure 2:
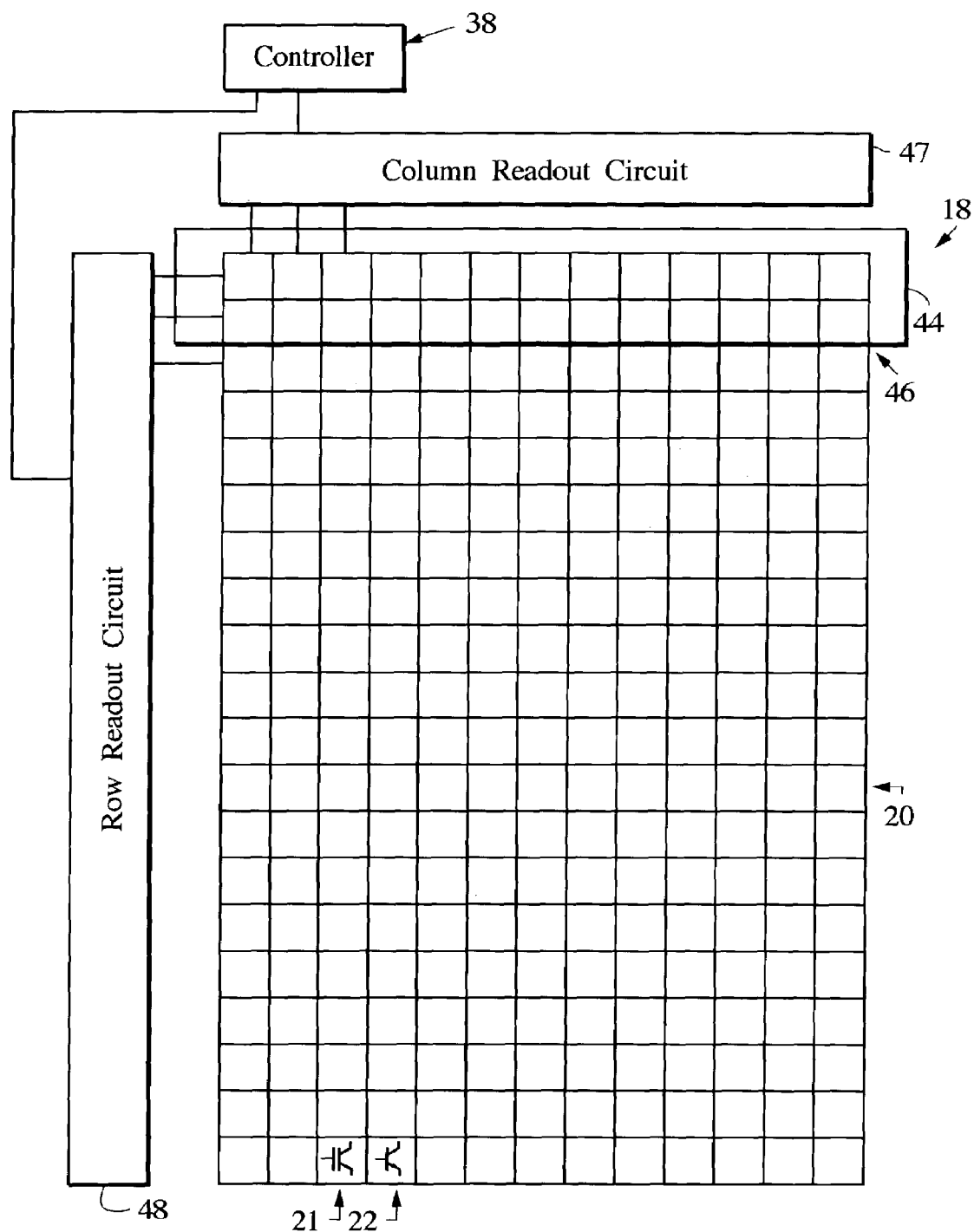
FIG. 2 is a plan view of an electromagnetic radiation detector with some pixels masked for black clamping.

Array 18 is shown in more detail, as a two-dimensional array of pixels 20, in FIG. 2, which is not to scale. Pixels 20 may include CMOS radiation sensors 21, bipolar sensors 22, or other available sensor type; all of the sensors would be of the same type. A few rows of pixels are physically covered by a mask 44, which allows little or no electromagnetic radiation to reach the underlying pixels 46. Masked pixels 46 output a "masked" signal which is compared to the black reference signal in the same manner as the image signals by diff. amp. 26. The diff. amp. outputs the difference between the two inputs as a normalized masked signal on comparator output line 30; this signal is typically very small or zero. ADC 32 converts the normalized masked signal to a digital masked signal which is then compared to a digital black reference. If different, the black clamp adjust circuit 38 adjusts the black reference signal on line 28 so that the level on line 30, digitized by the ADC, becomes more equal to the digital reference.

Masked pixels 46 output a signal that varies, along with the signals from the unmasked pixels, with environmental conditions. The level of the black reference signal will vary in a similar manner. Feeding the normalized masked signals back to the black clamp adjust circuit 38 causes the circuit to compensate for such variations and maintain an accurate black reference. For example, if temperature variations increase the level of the masked and unmasked pixel signals, the black clamp adjust circuit 38 produces a compensating increase in the black reference signal.

Pixel readout is typically performed in raster fashion, starting at the upper left-hand corner of array 18 and proceeding row by row, from left to right and top to bottom, until the pixel in the lower right-hand corner is read. The process is then repeated. System controller 40 controls column and row read-out circuits 47 and 48 that activate a particular column and row of array 18 with the pixel at the intersection of the activated column and row read out in a conventional manner. The controller sequences through the rows and columns to read out each desired pixel. Since system controller 40 controls which pixels are read, it will only activate black clamp adjust circuit 38 (or, optionally, direct multiplexer 42 to route its output to the black clamp adjust circuit 38) when masked pixels 46 are being read out. In this manner, only masked pixel signals are used by black clamp adjust circuit 38 to maintain a black reference for the imaging system.

Figure 3:
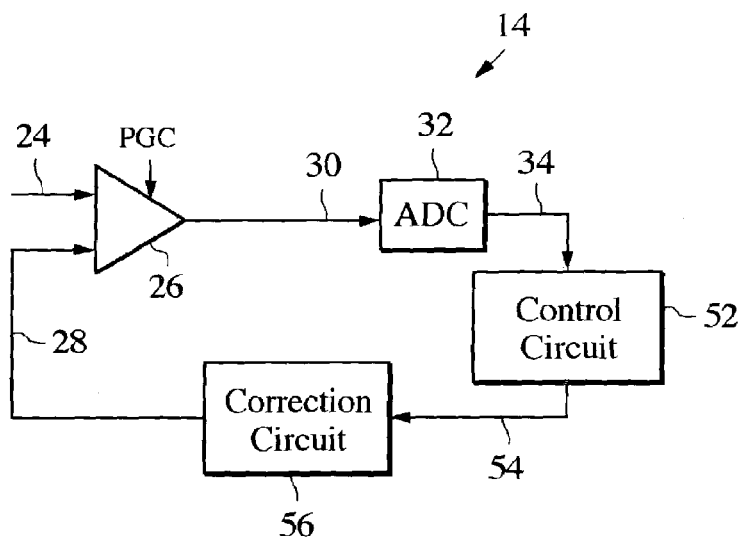
FIG. 3 is a block diagram of a black clamping circuit in accordance with the invention.

A black clamp circuit 14 according to one embodiment of the invention is shown in FIG. 3. Circuit 14 includes a diff. amp. 26, which outputs a normalized masked signal on output line 30 that corresponds to the difference between the black reference signal on line 28 and masked signals on line 24 during the interval that masked pixels are being read out. ADC 32 converts the normalized masked signal on diff. amp. output line 30 and outputs a digital normalized masked signal on ADC output line 34, as described above. Circuit 14 further includes a control circuit 52 configured to receive the digital normalized masked signal on line 34 and a digital reference signal on line 53 and, in response, depending upon whether the normalized masked signal is higher or lower than the reference, to produce a control signal on line 54. This control signal is used by a correction circuit 56 to produce a corrected black reference signal on line 28. Control circuit 52 and correction circuit 56 collectively comprise the black clamp adjust circuit 38 of FIG. 1.

Diff. amp. 26 is typically implemented as an op amp, but other devices capable of performing a subtraction or comparison of two signals may be used, such as a digital adder, if the signals to be compared are digital. The normalized masked signal on diff. amp. output line 30 corresponds to the difference between the black reference signal on line 28 and the masked signal on line 24, amplified by the closed loop gain of the op amp.

In this embodiment, the masked signal on line 24 and the black reference signal on line 28 are analog signals. However, a digital implementation may also be employed. The digital signal on ADC output line 34 governs the operation of control circuit 52 in producing a control signal on line 54. Once in digital format, many different and precise calculations and tasks can be performed to adjust the black reference signal, such as averaging a number of readings of the masked pixel signal to minimize the number of corrections to be made, and to achieve a more uniform black reference.

Figure 4:
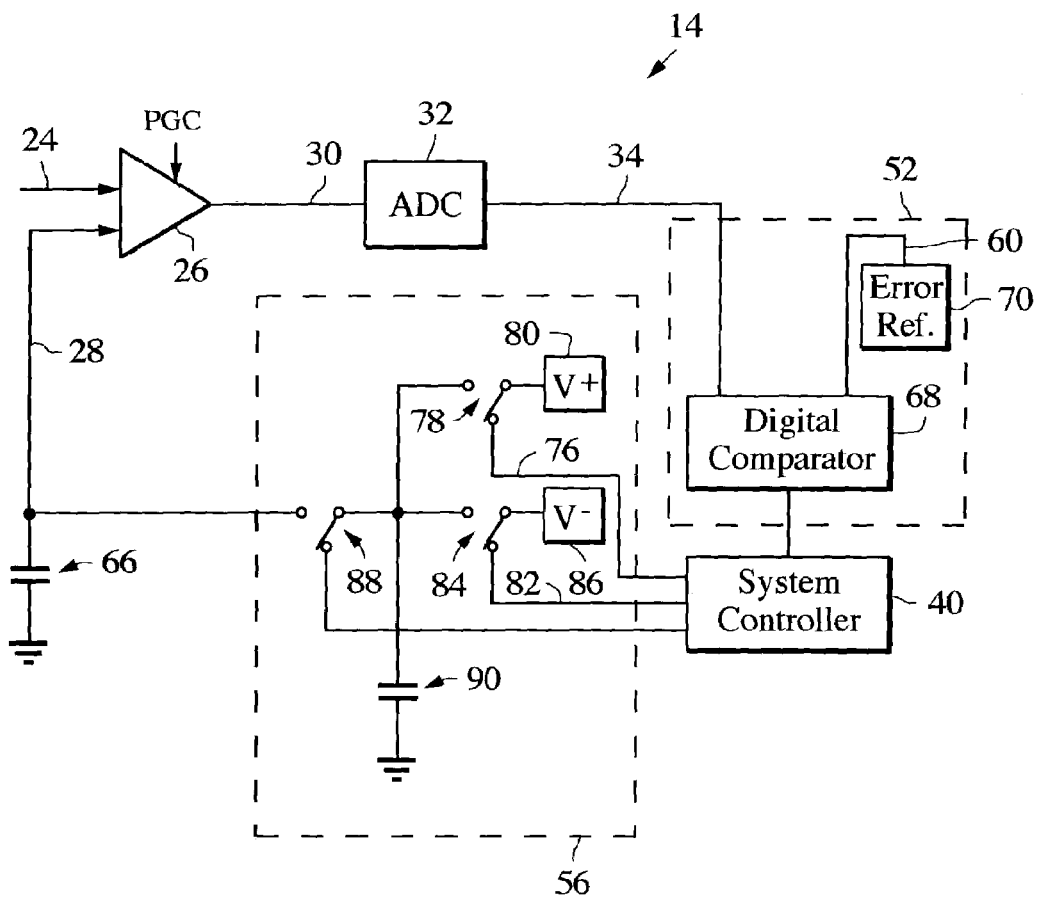
FIG. 4 is a schematic diagram of one implementation of the black clamping circuit of FIG. 3.

A particular implementation of the black clamp circuit 14 is shown in FIG. 4. The black reference signal is presented as a voltage level that can be adjusted and stored on a reference capacitor 66. Reference capacitor 66 holds the black reference signal constant between updates.

The digital normalized masked signal on ADC output line 34 is compared to a reference voltage on line 60 by a digital comparator 68, to determine the polarity of the digital normalized masked signal. The error reference is typically a fixed value such as ground, but it can be a programmable error reference 70 that enables a user to control the black level, or a fixed voltage level. System controller 40 responds to the output from digital comparator 68 by producing a series of switch control signals. These signals cause correction circuit 56 to produce an updated black reference signal on line 28, which is stored on reference capacitor 66 as a black reference signal for the unmasked pixels.

For purposes of explanation, assume that digital comparator 68, which compares the ADC output 34 to the reference signal 60, produces a negative output when a mashed pixel signal, converted to digital by ADC 32, is less than the reference 60. System controller 40 controls the correction circuit 56 to reduce the black reference signal when the error is negative, and to increase the black reference signal when the error is positive.

To increase the black reference signal, the system controller 40 sets a switch 78 to connect a positive voltage source 80 to charge a correction capacitor 90 to the voltage level of source 80. The positive voltage from source 80 is greater than any expected voltage level on reference capacitor 66. Switch 78 is then returned to the off position shown in FIG. 4, disconnected from correction capacitor 90, and the system controller 40 sets a correction switch 88 to connect the correction capacitor 90 to reference capacitor 66. Charge flows from correction capacitor 90 to the reference capacitor 66, reducing the voltage on correction capacitor 90 and increasing the voltage on reference capacitor 66, until the voltages equalize. Since reference capacitor 66 is preferably much larger than correction capacitor 90, it will take most of the charge. This allows small incremental adjustments to be made to the black reference signal provided by capacitor 66. Numerous small adjustments may be made to the black reference, as needed to bring it up to the level of the masked pixel signals on line 24. Such adjustments are made as long as the diff. amp. 26 indicates that the masked pixel signal level on line 24 exceeds the black reference signal level on line 28.

To reduce the black reference signal, the system controller 40 sets another switch 84 to connect correction capacitor 90 to a negative voltage source 86, which produces a voltage less than any expected voltage on reference capacitor 66. Capacitor 90 charges to the negative level of negative voltage source 86. Switch 84 is then returned to the off position shown in FIG. 4, disconnected from correction capacitor 90, and the system controller 40 sets correction switch 88 to correct correction capacitor 90 to reference capacitor 66 until the two capacitors equalize in voltage. The flow of charge from reference capacitor 66 to correction capacitor 90 reduces the black reference signal; the controller 40 repeats the process until the black reference signal level equals the masked pixel signals. All of the switches are preferably transistors of the same type (CMOS or bipolar) as the radiation sensors to simplify the single-chip fabrication process.

Correction capacitor 90 is typically charged up to its maximum voltage, but it may be charged to less than maximum by limiting the amount of time that it is connected to positive voltage source 80 or negative voltage source 86. Although one correction capacitor is shown, numerous capacitors of varying sizes may be used to make different, incremental adjustments to the black reference signal during one correction cycle, and different capacitors could be used for positive and negative corrections. The latter option would eliminate the need to discharge correction capacitor 90 and then recharge it to the opposite polarity when changing between positive and negative corrections, allowing the black reference signal to be set and adjusted more quickly and accurately.

While particular embodiments of the invention have been shown and described, numerous variations and alternate embodiments will occur to those skilled in the art. Accordingly, it is intended that the invention be limited only in terms of the appended claims.

I claim:

1. An imaging system, comprising:
    an electromagnetic radiation detector configured to produce an analog image signal;
    a black clamp adjust circuit which maintains a black reference signal for said image signal; a differential amplifier connected to compare said analog image signal to said black reference signal and to produce a normalized image signal;
    an analog-to-digital converter connected to convert said normalized image signal to a digital format; and
    a controller connected to control the timing and operation of said imaging system;
    wherein said black clamp adjust circuit, together with said diff. amp. and said analog-to-digital converter, maintains a black reference signal for said imaging system, and wherein the radiation detector, black clamp adjust circuit, differential amplifier and analog-to-digital converter are all directly connected to the controller and directly managed by the controller to continuously stabilize and maintain the black reference signal for said imaging system using reference data supplied by the electromagnetic radiation detector.

2. The system of claim 1, further comprising an output interface connected to produce an output signal in response to said digital normalized image signal.

3. The imaging system of claim 2, for a radiation detector with masked and unmasked pixels, wherein said controller routes signals from said unmasked pixels to said output interface and signals from said masked pixel to said black clamp adjust circuit.

4. The imaging system of claim 3, wherein said detector includes masked pixels which output masked signals, and unmasked pixels which output unmasked signals, and said controller activates said black clamp adjust circuit during the output of said masked signals and deactivates said black clamp circuit during the output of said unmasked signals.

5. The system of claim 1, wherein said electromagnetic radiation detector comprises a two-dimensional array of pixels.

6. An image sensing system, comprising:
    a substrate;
    an image sensor on said substrate;
    a plurality of black reference pixels on said substrate; and
    a black clamp circuit on said substrate, comprising a differential amplifier connected to produce an error signal corresponding to the difference between an analog masked signal produced by said image sensor and supplied to one leg of the amplifier, and said black reference signal supplied to the other leg of the amplifier, an analog-to-digital converter connected to convert said error signal to a digital format, a black clamp correction circuit which adjusts said black reference signal based upon the difference between said digital error signal and an error reference by applying an analog correction signal to the corresponding leg of said differential amplifier, a multiplexer connected to said analog-to-digital converter to synchronize processing of masked and unmasked pixels by said black clamp correction circuit; and a system controller that supervises black reference stabilization regardless of sensor operating mode by directly managing operation of said differential amplifier, said A/D converter, said black clamp correction circuit, and said multiplexer;
    wherein the image sensor, black reference pixels and black clamp circuit are directly connected to and managed by the system controller in order to constantly maintain an accurate black reference signal for said image sensor using reference data supplied by the black reference pixels.

7. The system of claim 6, wherein the image sensor and black clamp circuit share the differential amplifier and the analog-to-digital converter.

* * * * *